M. J. TRUMBLE.
EXPLOSIVE MIXTURE PREPARING DEVICE.
APPLICATION FILED MAY 7, 1919.

1,359,293.

Patented Nov. 16, 1920.
2 SHEETS—SHEET 2.

Inventor
Milon J. Trumble
by Graham + Harris
Attorneys

UNITED STATES PATENT OFFICE.

MILON J. TRUMBLE, OF ALHAMBRA, CALIFORNIA.

EXPLOSIVE-MIXTURE-PREPARING DEVICE.

1,359,293.   Specification of Letters Patent.   Patented Nov. 16, 1920.

Application filed May 7, 1919. Serial No. 295,807.

*To all whom it may concern:*

Be it known that I, MILON J. TRUMBLE, a citizen of the United States, residing in Alhambra, in the county of Los Angeles, State of California, have invented a new and useful Explosive-Mixture-Preparing Device, of which the following is a specification.

My invention relates to internal combustion engines and more particularly to devices by which explosive mixtures are prepared for use in such engines.

The principal object of my invention is to provide a device for preparing explosive mixtures from heavy fuels.

Further objects and advantages of my invention will be made evident hereinafter.

Referring to the drawings which are for illustrative purposes only,

Figure 1:
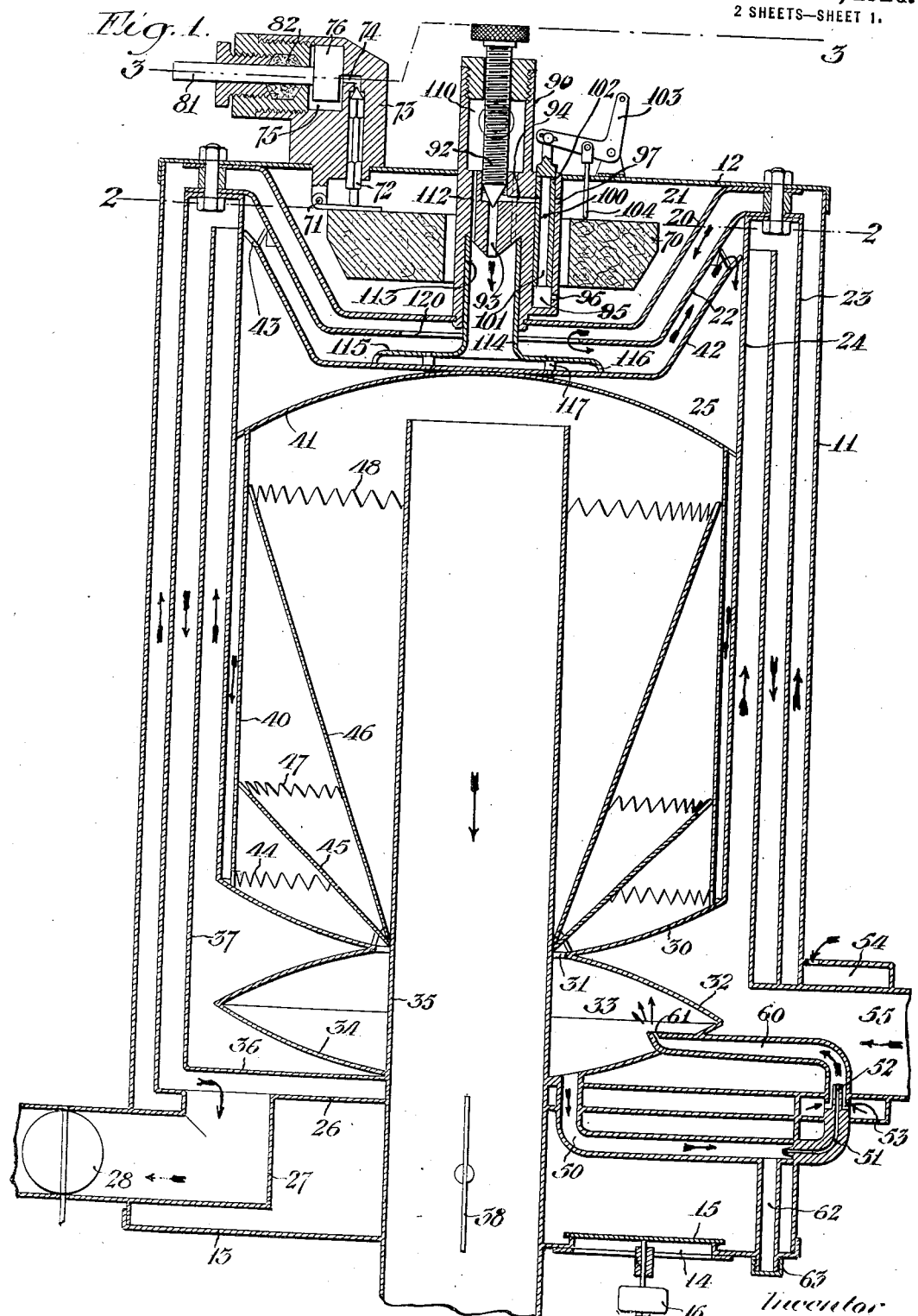
Figure 1 is a cross section through the center of a device embodying my invention.
Figure 2:
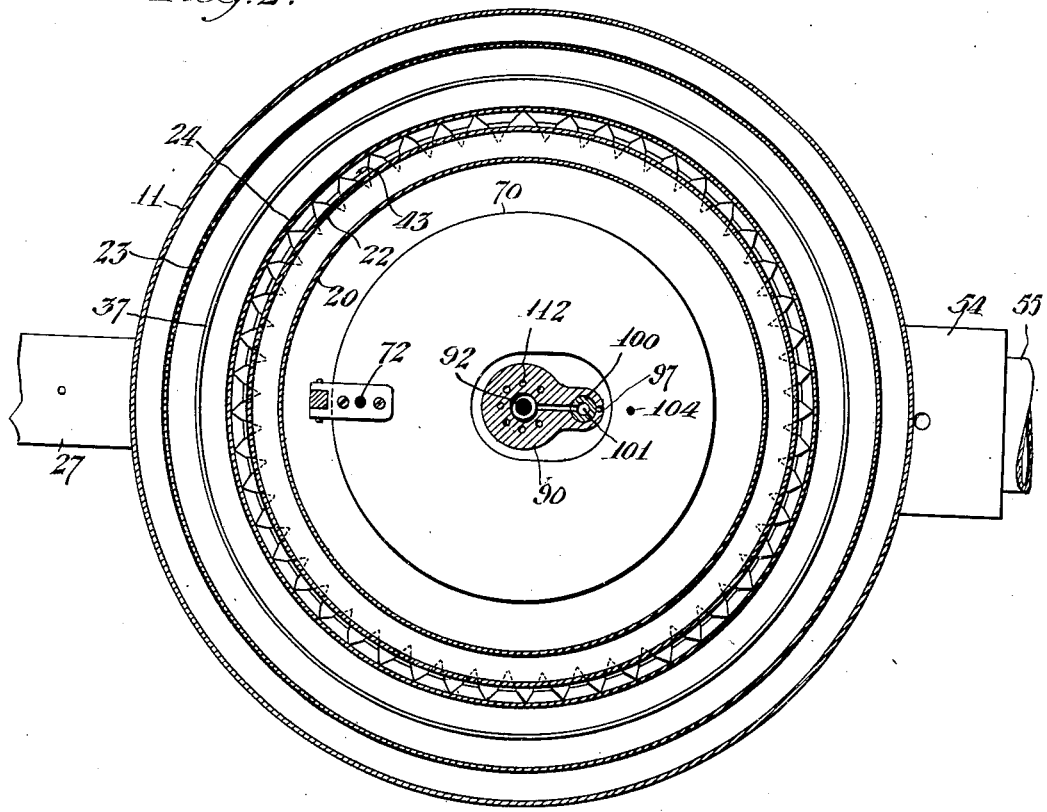
Fig. 2 is a section on a plane represented by the line 2—2 of Fig. 1.
Figure 3:
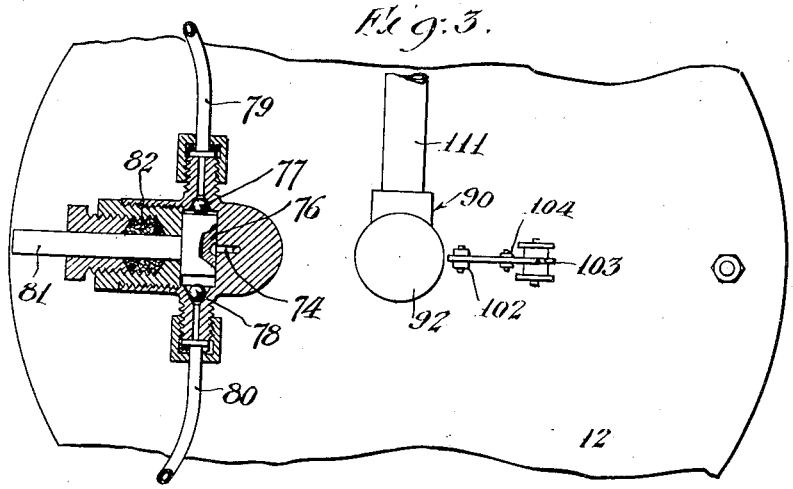
Fig. 3 is a section on a plane represented by the line 3—3 of Fig. 1.

In the form of the invention shown, a jacket 11 is provided with a tight top 12 and a bottom 13 having a cold air inlet 14 therein; this inlet being closed by a cold air check valve 15 held down by a weight 16. Secured in tight relationship to the top 12 is an upper pan 20, this pan forming with the top 12 a float chamber 21. Secured in spaced relationship to upper pan 20 is an intermediate pan 22 to which are secured a jacket 23 and a wall 24 forming a separating chamber 25. The jacket 23 is provided with a bottom 26 having a hot air outlet 27 opening therein, this hot air outlet passing through the jacket 11 and being provided with a valve 28. The wall 24 of the separating chamber 25 has a spherical bottom 30 having an opening 31 therein, the bottom 30 connecting with the top 32 of a revaporizing chamber 33, this chamber also having a bottom 34 which is secured in gas tight relationship to a central outlet tube 35 and to a bottom 36 which is secured to a baffle cylinder 37. The members 11, 23, 24 and 37 are all concentric cylinders spaced as shown. The outlet tube 35 passes through the opening 31 and the bottoms 26 and 13 and is provided with a mixture valve 38 actuated by any convenient means. Placed inside the wall 24 in spaced relationship therewith is a drum 40 having a spherical top 41 upon which a lower pan 42 rests, this lower pan having a serrated edge as shown at 43. The lower edge of the drum 40 is also serrated as shown at 44 and a lower cone 45 and an upper cone 46 are placed therein; these cones fitting loosely around the tube 35 so that any liquid which may run along their surfaces can pass between the tube 35 and the cones 45 and 46. The cone 45 and the cone 46 are serrated at their upper edge as shown at 47 and 48 to allow vapors to pass readily thereby.

Opening into the bottom of the vaporizing chamber 33 is a tube 50 which communicates through a small opening 51 with a nozzle 52. Small openings 53 are placed around the nozzle 52, these openings communicating with a pre-heating chamber 54 formed around a hot air inlet 55 which passes through jacket 11, the shell 23 and communicates with a space inside the baffle 37. The nozzle 52 projects into a pipe 60 which projects into the revaporizing chamber 33, having a small vaporizing opening 61 in the end thereof. A cleaning tube 62 closed with a cap 63 also communicates with the pipe 50. Located inside the float chamber 21 is a float 70 which is pivoted at 71, being formed of cork or some similar material and controlling the feed valve 72 in a fuel inlet casting 73. This inlet casting 73 is provided with a small cavity 74 which communicates with a larger cavity 75 in which a cam 76 is placed. This cam 76 is so arranged as to seat balls 77 and 78 in the openings to a gasolene pipe 79 or a distillate pipe 80. The cam 76 is operated through a shaft 81 passing through a stuffing box 82 by any convenient system of manual control.

Also secured in the top 12 is an atomizer casting 90 having an adjustable feed needle 92 therein, this feed needle partially closing an opening 93 which is fed with fuel through an opening 94. The opening 94 communicates with a priming valve cavity 95, this cavity 95 communicating through a small opening 96 with the bottom of the float chamber and through a similar opening 97 with the top of the float chamber 21. Sliding in cavity 95 is a valve 100 having a central opening 101 and having a cross opening 102. A priming lever 103 is connected to actuate the valve 100 also pushing the float 70 down through a small stem 104. Formed in the upper part of the atomizer casting 90 is a cavity 110 which is supplied with hot gas from any convenient source such as the exhaust of the engine by means of a pipe 111. A plurality of small openings 112 conduct this hot gas into the space 113 in the bottom of the casting 90 into which the opening 93 discharges. Secured in this space 113 is a tube 114 having a skirt 115 provided with serrated edges 116 and secured to and spread apart from the lower pan 42 by means of spacing rivets 117. The intermediate pan 22 has a central cavity 120.

The method of operation of my invention is as follows:

The float chamber 21 is kept full of fuel by means of float 70 and the valve 72, the valve 72 being opened whenever the level of the fuel float chamber falls and being closed automatically by the float 70 whenever this chamber fills. By turning the cam 76 either the ball 77 or the ball 78 may be lifted from its seat admitting either gasolene or distillate to the float chamber at will.

For starting purposes it is necessary to use gasolene and where the engine has been previously running on distillate and the float chamber is full of distillate, it is possible to prime the engine by actuating the priming valve lever 103, thus pushing the valve 100 downwardly and at the same time depressing the float 70 and allowing liquid to flow along the valve 72. In this case the cam 76 is turned to admit gasolene to the float chamber, this gasolene tending to float on top of the distillate and to be drawn in through the small openings near the top of the valve 100 into the cavity 93 through the opening 94. The needle valve 92 tends to thoroughly break up the fuel and spray it through the opening 93 into the chamber 113 in which it is mixed with hot gases delivered through the openings 112. As soon as the engine is started the priming needle 103 can be released and the distillate allowed to flow through the opening 96 and through the central opening 100 into the opening 94.

Quite regardless of whether distillate or gasolene is used the resulting heated mixture consisting of fuel and hot air passes downwardly and between the skirt 115 and the lower pan 42 spreading radially in all directions inside the lower pan 42 and mixing with heated air delivered through the opening 120. This heated air will have previously passed between the upper pan 20, the intermediate pan 22 and between the jacket 11 and the shell 23 having been admitted through the cold air inlet 14 in the bottom 13.

After the engine has been operated for a short time the hot exhaust gases are delivered through the pipe 55 to the space surrounding the separating chamber 25 and the vaporizing chamber 33, the hot gases passing upwardly between the baffle 37 and the walls 24 and downwardly between the baffle 37 and the shell 23 being finally withdrawn through the hot air outlet 27. The hot gases heat the walls of the separating chamber 25 and the revaporizing chamber 33 and also heats the incoming air which passes upwardly between the jacket 11 and the shell 23 this air entering through the cold air inlet 14. The mixture of atomized fuel, hot gases and heated air passes between the pans 22 and 42, between the serrations 43 and into the chamber 25, passing downwardly between the walls 24 and the drum 40 and through the serrations 40 into the interior of the drum. In the downward passage they are further heated by the gases outside the walls 24 so that the mixture in the interior of the drum 40 is in a heated condition. This mixture passes upwardly through the interior of the drum 40 through the serrations 47 and 48, its upward movement being relatively slow, due to the large diameter of the drum 40. This drum acts as a precipitating chamber and any particles of unvaporized liquid carried in the mixture tends to settle or condense therein, running down the cones 45 and 46 and running through the opening 31 into the revaporizing chamber 33. This revaporizing chamber is highly heated due to the exhaust gases and the liquid tends to revaporize therein passing upwardly through the opening 31 and joining the upwardly flowing stream of mixture therein. A portion of it, however, may not entirely vaporize and this portion settles in the tube 50 being delivered to the small opening 51 and tending to flow through the nozzle by gravity. The suction of the engine continuously draws in air through the preheating chamber 54 and through the openings 53, forming with the nozzle 52 an injector effect. The hot air from the preheating chamber 54 being intimately mixed with the fuel delivered through the tube 60, this mixture of air and fuel is further atomized through the small opening 61 and is drawn by the suction of the engine through the opening 31 into the stream of mixture flowing upwardly through the drum 40. The outlet tube 35 extends almost to the top of the drum 40 and is connected to the intake of the engine, the amount of fuel being taken in being controlled by means of the valve 38.

As a result of the above construction it will be seen that the fuel is first thoroughly atomized and mixed with air and that this mixture is then passed into a large chamber consisting of the drum 40 in which any unvaporized liquid is precipitated, this precipitated liquid being subjected to a further atomizing action and to the action of the heat to put it in condition for use in the engine.

I claim as my invention:

1. In an explosive mixture preparing device, a drum open at the bottom but with a closed top; a wall surrounding said drum and forming an annular heating space between said wall and said drum; means for delivering an explosive mixture to the space between said drum and said wall; means for applying a heating medium to said wall; a bottom secured in air tight relationship to said wall; and a central outlet tube passing through said bottom and extending to a point inside said drum near the top thereof.

2. In an explosive mixture preparing device, a drum open at the bottom but with a closed top; a wall surrounding said drum and forming an annular heating space between said wall and said drum; means for delivering an explosive mixture to the space between said drum and said wall; means for applying a heating medium to said wall; a bottom secured in air tight relationship to said wall; a central outlet tube passing through said bottom and extending to a point inside said drum near the top thereof and an inverted cone having serrations on its upper edge fitting against the inner surface of said drum, the lower end of said cone fitting loosely about said tube.

3. In an explosive mixture preparing device, a drum open at the bottom but with a closed top; a wall surrounding said drum and forming an annular heating space between said wall and said drum; means for delivering an explosive mixture to the space between said drum and said wall; a bottom secured in air tight relationship to said wall; walls forming a heating chamber surrounding said wall and said bottom; and a central outlet tube passing through said bottom and extending to a point inside said drum near the top thereof.

4. In an explosive mixture preparing device, a drum open at the bottom but with a closed top; a wall surrounding said drum and forming an annular heating space between said wall and said drum; means for delivering an explosive mixture to the space between said drum and said wall; a bottom secured in air tight relationship to said wall; walls forming a heating chamber surrounding said wall and said bottom; a central outlet tube passing through said bottom and extending to a point inside said drum near the top thereof and an inverted cone having serrations on its upper edge fitting against the inner surface of said drum, the lower end of said cone fitting about said tube.

In testimony whereof, I have hereunto set my hand at Los Angeles, California, this 30th day of April, 1919.

MILON J. TRUMBLE.